United States Patent [19]

Miyazaki et al.

[11] 3,975,498

[45] Aug. 17, 1976

[54] PROCESS FOR ADSORBING AND REMOVING NITROGEN OXIDES FROM WASTE GASES

[75] Inventors: Kazuhide Miyazaki, Tanashi; Kiyomi Abe, Kokubunji, both of Japan

[73] Assignee: Mitsui Mining & Smelting Co., Ltd., Tokyo, Japan

[22] Filed: Oct. 29, 1974

[21] Appl. No.: 518,958

[30] Foreign Application Priority Data
Oct. 31, 1973  Japan............................... 48-123237
May 9, 1974    Japan............................... 49-51541

[52] U.S. Cl................................ 423/239; 55/74; 423/395
[51] Int. Cl.²......................................... B01D 53/34
[58] Field of Search .......... 423/235, 239, 390, 395, 423/605; 55/68, 74; 23/232; 204/96

[56] References Cited
UNITED STATES PATENTS
2,779,659   1/1957   Koslov ................................. 423/50
3,702,889  11/1972   Goldman ........................... 423/605

OTHER PUBLICATIONS
"Chemical Abstracts"; vol. 52, 1968, p. 95346.
"Chemical Abstracts"; vol. 56, 1962, p. 8003.
"Chemical Abstracts"; vol. 57, 1962, p. 50.
"Chemical Abstracts"; vol. 70, 1969, 49033x.

*Primary Examiner*—G. O. Peters

[57] ABSTRACT

A process for adsorbing and removing nitrogen oxides from waste gases is disclosed, wherein nitrogen oxides are adsorbed in a layer packed with electrolytic manganese dioxide blocks and eluted with water or aqueous alkaline solution. The specific action of the adsorption agent used in said process is disclosed in detail.

7 Claims, No Drawings

PROCESS FOR ADSORBING AND REMOVING NITROGEN OXIDES FROM WASTE GASES

BACKGROUND OF THE INVENTION

It has generally been accepted that the nitrogen oxides (abbreviated hereafter as $NO_x$) in combustion waste gas consist mainly of nitrogen monoxide (NO) and nitrogen dioxide ($NO_2$). Since $NO_2$ forms to some extent nitric acid, nitrous acid or salts thereof when absorbed in water or aqueous alkaline solution, some removal methods have been proposed based on this property.

On the other hand, there is little development in the removal of NO, because NO is not readily absorbed in water or alkaline solution. As shown in the following equation:

$$2NO + O_2 \rightarrow 2NO_2$$

the oxidation efficiency of NO is proportional to the square of the NO concentration and, for this reason, the oxidation of NO contained in industrial waste gas is in such low concentration as the order of ppm, which makes its removal very difficult.

Although the use of an adsorption agent, such as activated charcoal, active alumina and zeolite has been proposed for eliminating $NO_x$, the adsorption efficiency of these adsorption agents is low, and at the same time their regeneration by wet methods is extremely difficult. Consequently $NO_x$ is usually discharged by dry methods through heating of the adsorption agent at a high temperature. When activated charcoal is employed as an adsorption agent, it must be heated up to the temperature of 200° to 300°C to discharge the $NO_x$, resulting in a red heat state. Deterioration and consumption of the charcoal are therefore inevitable and, furthermore, explosion hazards exist. For these reasons, activated charcoal has not been utilized to any extent as an adsorption agent for this purpose.

SUMMARY OF THE INVENTION

It is an object of this invention to provide a novel method for removing $NO_x$ from nitrogen oxide-containing gas. Another object of this invention is to provide a novel adsorption agent to adsorb $NO_x$ such as NO and $NO_2$ in waste gas frequently containing together $SO_2$ and $CO_2$ and by regenerating the adsorption agent by elution with water or aqueous alkaline solution. This invention is characterized by the unique action of electrolytic manganese blocks and characterized, in the treatment of nitrogen oxide-containing gas, by the following steps: (a) the adsorption of nitrogen oxides through a packed layer of electrolytic manganese dioxide blocks; (b) the elution of said nitrogen oxides with water or aqueous alkaline solution; and (c) the recycle of said electrolytic manganese dioxide blocks, after drying, to the aforesaid step of adsorption of nitrogen oxides.

The advantages of this invention are:

i. Special treatment for preparing the adsorption agent, for example, in powder form is eliminated;
ii. Efficient adsorption of NO, present in low concentration is achieved, not by gas phase oxidation but with electrolytic manganese dioxide blocks.
iii. The wet solution of $NO_x$, adsorbed in a packed layer of electrolytic manganese dioxide blocks, is accomplished with water or aqueous alkaline solution, as in the case of an ion-exchange column;
iv. The ready regeneration of the adsorption ability of electrolytic manganese dioxide blocks, merely by drying, enables the use of such blocks in a recycle of said blocks.

DETAILED DESCRIPTION OF THE INVENTION

In a column packed with a layer of electrolytic manganese dioxide blocks of lump size (1–3cm in size) or coarse grain (0.2–1cm in size), $NO_x$ is adsorbed for a given period of time, and then, water, ammoniacal aqueous solution, or sodium hydroxide solution is passed through the above packed layer to elute and recover directly the $NO_x$ adsorbed, in the form of nitric acid, nitrous acid or salts thereof, requiring no heating to discharge the $NO_x$. The ability of electrolytic manganese dioxide blocks to adsorb $NO_x$ can be regenerated merely by drying it at about 100°C.

This invention is based on the finding that electrolytic manganese dioxide blocks are able to repeat a certain cycle, i.e. the gas phase adsorption of $NO_x$-liquid phase removal of $NO_x$ followed by regeneration of the manganese dioxide. This is unobvious over heretofore known methods of removing $NO_x$ from waste gases.

Although the fundamental mechanism of said cycle, i.e. adsorption of $NO_x$; removal of $NO_x$; regeneration of the manganese dioxide through a packed layer of the electrolytic manganese dioxide blocks is not known, it is believed that fine micropores are held within the electrolytic manganese dioxide deposits, and thereby, partial catalytic oxidizing of the adsorbed $NO_x$ results in the more efficient adsorption of $NO_x$.

The present invention will be more fully understood by the following examples, which are intended to be illustrative only. In the examples, $NO_x$ was analyzed by the chemiluminescence method.

EXAMPLE 1

In a cylindrical column, 60 mm in diameter, 600 mm in height, and fitted at the bottom with a perforated plate (pores in 1 mm diameter), 1000 ml of electrolytic manganese dioxide blocks (4–10 meshes grain) was packed and a gas of a composition adjusted to that of a combustion gas was introduced to the bottom of this column at room temperature and at a rate of 4000 ml/min. The composition was as follows: NO: 600–800 ppm; $O_2$: 10%; $N_2$: the remainder. For comparison, each 1000ml of the hitherto used adsorption agent, such as activated alumina and zeolite, was packed in similar columns and control experiments were performed. The results obtained are shown on the following Table 1.

Table 1

| Method | NO-adsorption of adsorption agents. NO (ppm) before adsorption | after adsorption | Rate of adsorption(%) |
|---|---|---|---|
| By the present invention | 800 | 5 | 99.3 |
| Activated alumina | 800 | 416 | 48.0 |
| Zeolite (hard) | 662 | 562 | 15.1 |
| Zeolite (soft) | 662 | 600 | 9.3 |

As shown in Table 1, when the packed layer for $NO_x$ adsorption according to the present invention was employed to remove NO from combustion waste gas, its NO adsorption ability surpassed that of the hitherto used adsorption agents such as activated alumina and activated zeolite.

EXAMPLE 2

A series of cyclic tests, i.e. adsorption, discharge, and regeneration were carried out with the same column as in Example 1. The electrolytic manganese dioxide blocks of this invention and activated alumina, for comparison purposes, were respectively packed, and a gas prepared similar to combustion waste gas was introduced at room temperature and at a rate of 4000 ml/min. for the $NO_x$-absorption. The gas composition was as follows: $NO_x$, 1200 ppm; No, 1000 ppm; $NO_2$, 10%; $N_2$, the remainder.

The adsorbed $NO_x$ was eluted with water by spraying at a rate of 30 ml/min. for 60 minutes as a mixed solution of nitrous acid and nitric acid.

The rate of $NO_x$-adsorption during the first 5 hours and rate of $NO_x$ elution are compared in Tables 2 and 3, respectively.

Table 2

| Time (hour) | $NO_x$-adsorption ability. Rate of $NO_x$-adsorption by the method of this invention | Rate of $NO_x$-adsorption by activated alumina |
|---|---|---|
| 0 | 99.8% | 48.1% |
| 1 | 99.2 | 39.8 |
| 3 | 90.8 | 31.0 |
| 5 | 80.0 | 27.0 |

Table 3

| | $NO_x$ Elution. | | | |
|---|---|---|---|---|
| | By the method of present invention | | By activated alumina | |
| Time (min) | $NO_2^-$ | $NO_3^-$ | $NO_2^-$ | $NO_3^-$ |
| 0 | 10.3% | 26.7% | 22.9% | 6.6% |
| 0–30 min. | 14.1 | 33.9 | 27.9 | 6.6 |
| 30–60 min. | 3.9 | 8.1 | 16.1 | 0.8 |
| Total elution | 28.3 | 68.7 | 66.9 | 14.0 |
| | 97.0% | | 80.9% | |

It is clear that the rate of $NO_x$ adsorption by the method of this invention is exceedingly superior to that of alumina within a certain period of time. The figures at zero time show the rate of $NO_x$ adsorption of the initially introduced gas.

Analysis of $NO_2^-$(nitrite ion) and $NO_3^-$(nitrate ion) in effluents indicates that, though the ratio $NO/NO_x$ in the gas remains unchanged after elution by activated alumina, the ratio of $NO_3$ present is larger and rate of discharge of $NO_x$ is excellent by the method of the present invention.

Table 4 shows the results of an $NO_x$-adsorption test after drying the adsorption agents at 100°C for 5 hours as the regeneration process.

Table 4

| | Regeneration test. | |
|---|---|---|
| | Adsorption Agent of this invention | Activated alumina |
| Gas | | |
| Time (min) | $NO_x$ | $NO_x$ |
| 0 | 99.8% | 48.0% |

Thus, according to this invention, the ability of $NO_x$ adsorption of the packed layer is restored to the original condition merely by drying. This is a great advantage, and represents a significant saving in cost, as a result of this invention.

EXAMPLE 3

The elution properties of the adsorption agent of this invention were examined by using activated charcoal as a comparison adsorption agent. $NO_x$ was adsorbed in both activated charcoal and the electrolytic manganese dioxide blocks of this invention under the same conditions. The quantities of the retained $NO_x$ in the respective adsorption agents were nearly equal: 2000 ml of $NO_x$ per 1000 ml of adsorption agent. In table 5 are shown the results of the elution of $NO_x$ with 1% ammoniacal aqueous solution.

Table 5

| | Comparative test of $NO_x$ elution characteristics. | | | |
|---|---|---|---|---|
| | By the present invention | | By activated charcoal | |
| Time (min) | $NO_2^-$ | $NO_3^-$ | $NO_2^-$ | $NO_3^-$ |
| 0 | 10.3% | 26.7% | 6.0% | 16.0% |
| 0–30 min. | 14.1 | 33.9 | 9.3 | 25.6 |
| 30–60 min. | 3.9 | 8.1 | 5.0 | 12.1 |
| Total elution | 28.3 | 68.7 | 20.3 | 53.7 |
| | 97.0 | | 94.0 | |

It is obvious from Table 5 that the elution process can be put in practice more efficiently and simply by the method of this invention than by the use of activated charcoal. Since a considerable amount of $NO_x$ remains in the activated charcoal because of incomplete elution, a completely reversible cycle as accomplished by this invention (such as absorption, elution, regeneration) can not be performed with activated charcoal. Similar results were obtained when 1% sodium hydroxide solution was employed as an eluent.

EXAMPLE 4

The ability of NO adsorption was examined by using a similar column as in Example 1, packed with electrolytic manganese dioxide blocks (2–10 meshes grain), and introducing a mixed gas at 60°C at a rate of 8000 ml/min. The gas composition was as follows: NO: 500 ppm; $SO_2$: 200 ppm; $O_2$: 10%; $N_2$: the remainder. Similar tests were conducted on 1000 ml of silica gel for comparison purposes. The results obtained are shown in Table 6.

Table 6

| | Comparative test of NO-adsorption ability | | |
|---|---|---|---|
| | NO (ppm) | | |
| Method of adsorption | before adsorption | after adsorption | Rate of adsorption (%) |
| By the present invention | 787 | 3 | 99.8 |
| Silica gel | 610 | 230 | 62.2 |

As indicated in Table 6, mixing 200 ppm of $SO_2$ in the test gas did not affect the ability of NO adsorption at all, according to the present invention. The adsorption ability surpassed hitherto used silica gel.

EXAMPLE 5

The ability of NO adsorption of the electrolytic manganese dioxide blocks was tested by using a similar column as in Example 1 and introducing at 60°C and at a rate of 12000 ml/min. a gas having the following composition:
NO: 500–600 ppm; $SO_2$: 100 ppm; $O_2$: 5%; $CO_2$: 10%; $N_2$: the remainder. Similar tests were carried out on zeolite for comparison purposes. The results of the 5 hour adsorption is shown in Table 7.

Table 7

| Method of adsorption | Comparative test of NO adsorption ability NO (ppm) | | |
|---|---|---|---|
| | before adsorption | after adsorption | Rate of adsorption (%) |
| By the present invention | 600 | 2 | 99.7 |
| zeolite | 590 | 445 | 14.5 |

While the rate of adsorption of zeolite decreased to zero after 3 hours, the adsorption agent according to this invention maintained the rate up to 55%.

After elution with water, the adsorption agent was dried at 100°C for 5 hours. The ability of NO adsorption after this regeneration was examined by means of gas of the same composition as above and the results are shown in Table 8.

Table 8

| Method of adsorption | Regeneration ability of NO-adsorption NO(ppm) | | |
|---|---|---|---|
| | before adsorption | after adsorption | Rate of adsorption (%) |
| By the present invention | 530 | 3 | 99.4 |
| zeolite | 510 | 439 | 14.0 |

It was thus confirmed that the NO adsorption ability of the adsorption agent according to this invention was exceedingly superior to that of zeolite and was easily regenerated by elution and drying, resulting in ready use for the next cycle. The ability of the NO adsorption was maintained in fairly high space velocity even in the case of the most ordinary composition of combustion waste gas containing $SO_2$ and $CO_2$.

EXAMPLE 6

Electrolytic manganese dioxide blocks were tested as an adsorption agent for gas analysis. A gas composed of $NO_x$ (590 ppm); $O_2$(5%); $CO_2$(10%); and $N_2$ (the remainder) was introduced continuously at a rate of 4000 ml/min for 5 minutes into the same column packed with electrolytic manganese dioxide blocks as in Example 1. Sampling of the waste gas was carried out by adsorbing it in this column. The adsorbed $NO_x$ was discharged by eluting with water at a rate of 20 ml/min for 60 minutes by spraying water from the top of the column, in the form of a mixed solution of nitrite ion ($NO_2^-$) and nitrate ion ($NO_3^-$). Both ions were determined respectively by the methods of quantitative analysis for nitrite ion (NEDA method) and nitrate ion (brucine method). The sum of the concentration of both ions was regarded as the amount of $NO_x$ adsorbed initially in the column. For comparison, a similar experiment was conducted on 1000 ml of activated charcoal conventionally used as a gas adsorption agent. Table 9 shows the values determined of nitrite and nitrate ions and equivalent values to $NO_x$.

Table 9

| | Determination of $NO_x$ in gas (ppm) | | |
|---|---|---|---|
| | Nitrite ion | Nitrate ion | $NO_x$-value |
| By the present invention | 1.0ppm | 556ppm | 557ppm |
| By activated charcoal method | 286 | 24 | 310 |
| Standard value ($NO_x$-value by chemiluminescence method) | | | 590 |

As indicated in Table 9, the method by this invention is far superior to the prior art, as illustrated by the adsorption value of $NO_x$ from nitrogen oxide-containing gas, in comparison to the standard value ($NO_x$-value by the chemiluminescence method), and compared with the case of activated charcoal. Furthermore, the ratio of nitrate ion in the effluent with respect to the adsorption agent of this invention is by far higher than that obtained from activated charcoal. The reason is that the adsorption agent according to this invention adsorbs more $NO_x$ in the form of reactive $NO_2$ than activated charcoal does, and $NO_2$ thus adsorbed is more easily soluble in water than NO is.

EXAMPLE 7

Gas composed of $NO_x$ (86 ppm, by the chemiluminescence method), $CO_2$(12%), $SO_2$(500ppm), $O_2$(5%), $H_2O$ (5%) and $N_2$ (the remainder) was introduced at a rate of 5000 ml/min for 20 minutes into the same column packed with electrolytic manganese dioxide blocks as in Example 1. Then water was passed through the column at a rate of 20 ml/min for 60 minutes. The effluent recovered was submitted to determination of nitrite and nitrate ions as in Example 6. The amount of $NO_x$ adsorbed was calculated as the sum of the concentration of both ions. Similar experiments were carried out by using activated charcoal for comparison purposes. Table 10 shows the results obtained.

Table 10

| | $NO_x$ in gas | | |
|---|---|---|---|
| | Nitrite Ion | Nitrate Ion | $NO_x$-value |
| By the present invention | 0.4 ppm | 89.6 ppm | 90.0 ppm |
| By activated charcoal method | 25.5 | 25.0 | 50.5 |
| Standard value | | | 86 |

As is clear from Table 10, $NO_x$ is more efficiently adsorbed and eluted by the method of this invention than by activated charcoal, even when the gas contains low concentrations of $NO_x$ in the presence of about 500 ppm of $SO_2$ and a considerable quantity of $CO_2$ (generally, combustion waste gas contains 10–15% of $CO_2$).

Resort may be had to such modifications and equivalents as fall within the spirit of the invention and the appended claims.

What we claim is:

1. A process for adsorbing and removing nitrogen oxides from waste combustion gas, utilizing electrolytic manganese dioxide blocks and regenerating the same comprising:
   a. adsorbing said nitrogen oxides by passing said waste combustion gas through a column packed with electrolytic manganese dioxide blocks upwardly at a flow rate sufficient to substantially completely remove said nitrogen oxides until the adsorbing capacity of said electrolytic manganese dioxide blocks is substantially diminished;
b. eluting said column with a material selected from water or dilute aqueous alkaline solution; and
c. regenerating said electrolytic manganese dioxide blocks by drying the same at an elevated temperature.

2. A process according to claim 1, wherein said electrolytic manganese dioxide blocks are of a size of from about 1.65 to 30 mm, average size.

3. A process according to claim 1, wherein combustion waste gas at a rate of about 240 to 720 l/hour is fed into a column packed with about one liter of said electrolytic manganese dioxide blocks.

4. A process according to claim 1, wherein nitrogen monoxide included in nitrogen oxide is adsorbed and oxidized to nitrogen dioxide.

5. A process according to claim 1, wherein said nitrogen oxide is adsorbed by said manganese dioxide blocks, eluted with a substrate selected from water or aqueous alkaline solution, and said electrolytic manganese dioxide is dried and recycled for the adsorption of further nitrogen oxide.

6. A process according to claim 5, wherein said nitrogen oxide is eluted and said electrolytic manganese dioxide blocks are dried at about 100°C for about 5 hours.

7. A process according to claim 5, wherein about 20 to 30 ml/min. of water or aqueous alkaline solution is sprayed down for one hour, through a layer packed with about one liter of electrolytic manganese dioxide block, to elute the adsorbed nitrogen oxide from said layer.

* * * * *